July 31, 1945.  E. H. HAUG  2,380,522
POWER FACTOR CONTROLLING APPARATUS
Filed June 9, 1944
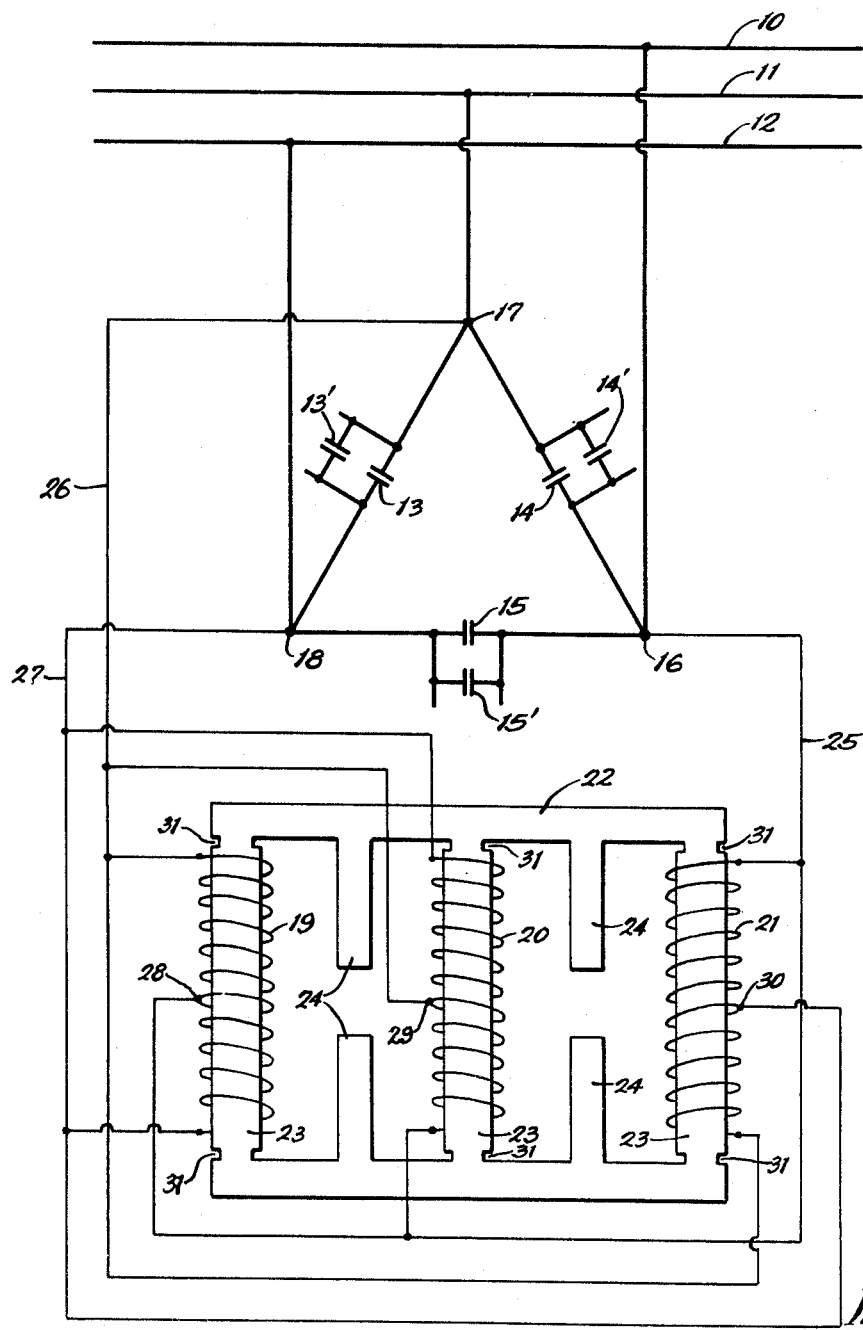
Inventor:
Eugene H. Haug,
By Dawson, Ormsby Booth
Attorneys.

Patented July 31, 1945

2,380,522

UNITED STATES PATENT OFFICE 2,380,522

POWER FACTOR CONTROLLING APPARATUS

Eugene H. Haug, Glencoe, Ill., assignor to La Salle National Bank, Chicago, Ill., as trustee Application June 9, 1944, Serial No. 539,419

2 Claims. (Cl. 172—246)

This invention relates to power factor controlling apparatus and more particularly to apparatus to supply leading current to a three-phase power supply circuit.

One of the objects of the invention is to provide power factor control apparatus in which leading current is introduced into a three-phase supply circuit between the source and the load to maintain the power factor in the circuit at a desired high value.

Another object of the invention is to provide power factor control apparatus in which the several phases of the supply circuit are maintained in proper balance.

Still another object is to provide power factor control apparatus in which interconnected capacitors are connected across the individual phases of a supply circuit and inductive windings are connected to the capacitors to maintain the circuit in balance. According to one feature of the invention, the inductive windings are saturable to limit the voltage across the capacitors.

The above and other objects and advantages will be more readily apparent from the following description when read in connection with the accompanying drawing, in which—

The single figure is a circuit diagram of apparatus embodying the invention.

The apparatus as shown is adapted to control the power factor in a three-phase circuit including lines 10, 11 and 12. The apparatus comprises three capacitors 13, 14 and 15 connected respectively across the supply lines so that each capacitor is across one phase of the three-phase supply. To increase the capacity of the apparatus, additional capacitors may be connected in parallel with the capacitors 13, 14 and 15 as indicated at 13', 14' and 15'.

The capacitors are preferably connected in a delta circuit having terminals 16, 17 and 18 which are connected respectively to the lines 10, 11 and 12.

In order to maintain the circuit in balance and to limit the voltage across the capacitors to a safe value, inductive windings are provided connected across the capacitors. As shown, three such inductive windings are employed indicated at 19, 20 and 21. The windings are mounted on the legs of the magnetic frame or core 22 having three spaced legs 23 connected by the ends of the frame. Preferably, short legs 24 are provided on the frame between the legs 23 spaced apart at their ends to increase the inductive effect of the windings.

The windings are connected to the delta circuit by wires 25, 26 and 27 which connect respectively to the terminals 16, 17 and 18 of the circuit. The wire 25, as shown, is connected to one end of each of the windings 20 and 21 and to a center tap 28 on the winding 19. The wire 26 is similarly connected to one end of each of the windings 19 and 21 and to a center tap 29 on the winding 20. In like manner, the wire 27 is connected to one end of each of the windings 19 and 20 and to a center tap 30 on the winding 21. Thus, the ends of each of the windings are connected to two of the terminals of the delta circuit in such a way that the winding is in parallel with the capacitor between the terminals and the center tap on the winding is connected to the third terminal of the circuit.

In operation, the capacitors serve to introduce a leading current into the supply circuit to counteract the effect of an inductive load supplied by the circuit and to maintain the power factor at a value near unity. It will be noted that the several capacitors supplement each other since any extremely heavy inductive load across the phase between lines 10 and 11, for example, will effect all three of the capacitors. This is true because the capacitor 14 is directly across the two lines in question and the capacitors 13 and 15 are in series across the lines.

Since the windings 19, 20 and 21 are in parallel with the capacitors they serve to limit the impressed voltage across the capacitors to the amount of voltage drop in the windings. Preferably the legs 23 of the frame are made saturable as by providing reduced portions 31 therein and are operated near their saturation point. With this construction the voltage across the capacitors is limited to a maximum safe value so that they will not be burned out.

The interconnection between the several capacitors and the individual inductive windings is such as to maintain the several phases of the supply circuit in balance so that the voltage across any one phase will at all times be equal to the voltage across the other phases. Considering, for example, the winding 19, the ends of which are connected across the capacitor 13 and the center tap of which is connected to the terminal 16. If the voltage across the capacitor 14 should tend to exceed that across the capacitor 15, there would be a tendency for the voltage in the upper half of the winding 19 to exceed that in its lower half. This, of course, is a condition which cannot exist so that the winding 19 will tend to equalize the voltages across the capacitors 14 and 15. In like manner, the other windings will equalize the voltages across the other pairs of capacitors so that the circuit will be maintained in perfect balance at all times.

While one embodiment of the invention has been shown and described in detail herein, it is to be understood that this is illustrative only and is not intended as a definition of the scope of the invention, reference being had for that purpose to the appended claims.

What is claimed is:

1. Power factor controlling apparatus for use with a three-phase three line power supply comprising a delta circuit adapted to have its terminals connected respectively to the three lines of the power supply, capacitors in each of the legs of the delta circuit, a magnetic core having three interconnected legs and means forming air gaps between the legs, windings on the legs, connections from the ends of the windings to the terminals of the delta circuit whereby each winding is connected across one of the capacitors, and center taps on the windings connected to the terminals of the delta circuit so that each center tap is connected to the terminal opposite the capacitor across which its corresponding winding is connected.

2. The construction defined in claim 1 in which the legs of the core are saturable and the current through the windings is such as to maintain the legs near their saturation point.

EUGENE H. HAUG.